United States Patent
Miyazaki et al.

(10) Patent No.: US 6,637,487 B2
(45) Date of Patent: Oct. 28, 2003

(54) PNEUMATIC TIRE

(75) Inventors: Shinichi Miyazaki, Kobe (JP); Takeshi Ohta, Kobe (JP); Kazumi Yamazaki, Kobe (JP); Takuji Kusumoto, Kobe (JP); Osamu Toda, Kobe (JP)

(73) Assignee: Sumitomo Rubber Industries, Ltd., Hyogo-ken (JP)

( * ) Notice: Subject to any disclaimer, the term of this patent is extended or adjusted under 35 U.S.C. 154(b) by 0 days.

(21) Appl. No.: 09/742,406

(22) Filed: Dec. 22, 2000

(65) Prior Publication Data

US 2001/0018942 A1 Sep. 6, 2001

(51) Int. Cl.$^7$ .............. B60C 9/18; B60C 9/20; B60C 9/00
(52) U.S. Cl. ............ 152/526; 152/527; 152/529; 152/535; 152/451; 57/902
(58) Field of Search ............... 152/451, 526, 152/527, 535, 536, 529, 534; 57/902

(56) References Cited

U.S. PATENT DOCUMENTS

| | | | |
|---|---|---|---|
| 4,161,203 A | | 7/1979 | Suzuki et al. |
| 5,332,017 A | * | 7/1994 | Imamiya et al. ........... 152/526 |
| 5,524,687 A | * | 6/1996 | Poque et al. ............... 152/526 |
| 5,662,752 A | * | 9/1997 | Nakano ..................... 152/526 |
| 5,858,137 A | * | 1/1999 | Assaad et al. .............. 152/451 |
| 6,273,161 B1 | * | 8/2001 | Yamagami et al. ......... 152/527 |

FOREIGN PATENT DOCUMENTS

| | | | |
|---|---|---|---|
| EP | 1 066 989 A | | 1/2001 |
| JP | 06255312 | * | 9/1994 |
| JP | 10-44713 | * | 2/1998 |
| JP | 11 091311 A | | 4/1999 |

OTHER PUBLICATIONS

"Flat Wires for Reinforcement of Rubber Tires," Research Diclosure, Kenneth Mason Publications, Hampshire, GB, NR., 364, pp. 409–411 XP000468934 ISSN: 0374–4353.

* cited by examiner

Primary Examiner—Steven D. Maki
Assistant Examiner—Justin Fischer
(74) Attorney, Agent, or Firm—Birch, Stewart, Kolasch & Birch, LLP

(57) ABSTRACT

A pneumatic tire comprises the following belt (A) or belt (B). The belt (A) comprises a ply made of waved monofilament steel cords and a ply made of multi-filament steel cords, wherein the waved monofilament steel cord is (1) spirally waved so that the wave pitches PA are in a range of from 14 to 50 mm and the amplitude HA of each wave is in a range of from 0.002 to 0.02 times the pitch PA of the wave, or (2) two-dimensionally waved so that the wave pitches PB are in a range of from 5 to 50 mm, and the amplitude HB of each wave is in a range of from 0.002 to 0.05 times the pitch PB of the wave. The belt (B) comprises two plies made of waved monofilament steel cords, wherein the waved monofilament steel cord is waved so that the wave pitches P are in a range of from 0.008 to 0.08 times the circumference of the tire and the wave height of each wave is in a range of from 0.002 to 0.025 times the pitch P of the wave.

7 Claims, 14 Drawing Sheets

Fig.2
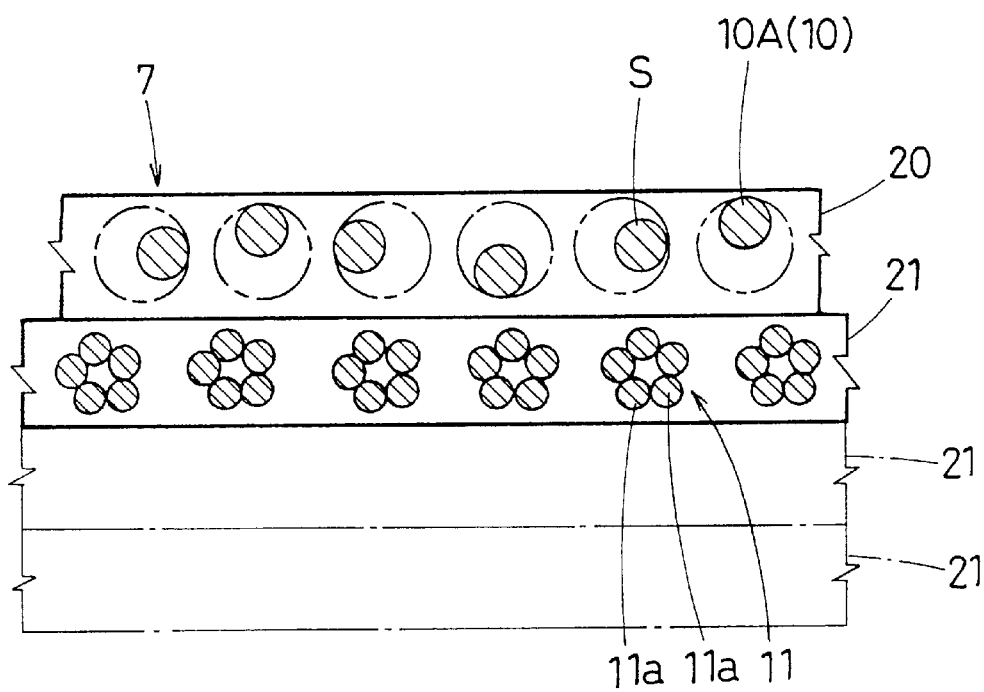
Fig.3A        Fig.3B        Fig.3C
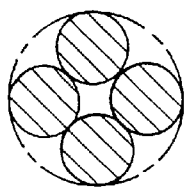    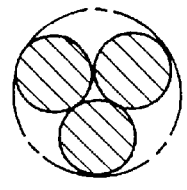    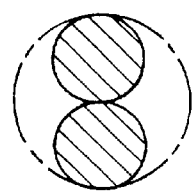

PNEUMATIC TIRE

The present invention relates to a pneumatic tire more particularly to a radial tire having an improved belt structure being capable of reducing the tire weight.

Multi-filament cords made of a plurality of steel filaments twisted together are widely used in the belts of belted radial tires.

In recent years, in order to reduce the tire weight and cost, a belt composed of monofilament steel cords has been proposed.

However, in comparison with multi-filament cords, the monofilament cords are high in the bending rigidity and inferior in the fatigue resistance and durability. As a result tire performance such as ride comfort, steering stability during cornering and the like is not good.

It is therefore, an object of the present invention to provide a radial tire improved in the durability, ride comfort, steering stability and the like, while achieving weight reduction and cost reduction.

According to one aspect of the present invention a pneumatic tire comprises a carcass extending between bead portions through a tread portion and sidewall portions, and a belt disposed radially outside the carcass in the tread portion, the belt comprising a monofilament cord ply made of waved monofilament cords and a multi-filament cord ply made of multi-filament cords. Preferably, each waved monofilament steel cord has a cross sectional area of from 0.09 to 0.30 sq.mm. The waved monofilament steel cord is (1) spirally waved so that the wave pitches PA are in a range of from 14 to 50 mm and the amplitude HA of each wave is in a range of from 0.002 to 0.02 times the pitch PA of the wave, or (2) two-dimensionally waved so that the wave pitches PB are in a range of from 5 to 50 mm, and the amplitude HB of each wave is in a range of from 0.002 to 0.05 times the pitch PB of the wave.

According to another aspect of the present invention a pneumatic tire comprises a carcass extending between bead portions through a tread portion and sidewall portions, and a belt disposed radially outside the carcass in the tread portion, the belt comprising two monofilament cord plies made of waved monofilament cords. Preferably, the waved monofilament steel cord is waved so that the wave pitches P are in a range of from 0.008 to 0.08 times the circumference of the tire and the wave height of each wave is in a range of from 0.002 to 0.025 times the pitch P of the wave. The waved monofilament steel cord has an average thickness of from $0.13 \times 10^{-3}$ to $0.28 \times 10^{-3}$ times the circumference of the tire.

Embodiments of the present invention will now be described in detail in conjunction with the accompanying drawings.

FIG. 2 is a cross sectional view of an example of the belt.

FIGS. 3A, 3B and 3C are cross sectional views each showing an example of the multi-filament cord.

FIGS. 4–13 each show an example of the waved monofilament cord and the amplitude and pitch of the wave thereof.

Figure 14:
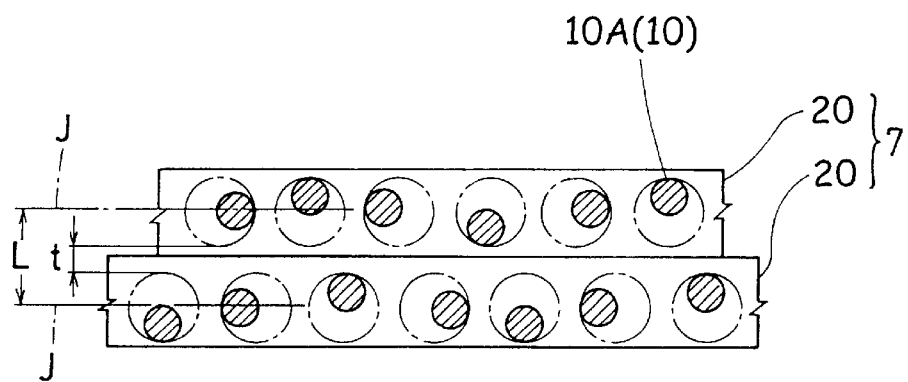

FIG. 14 is a cross sectional view of another example of the belt.

Figure 15:
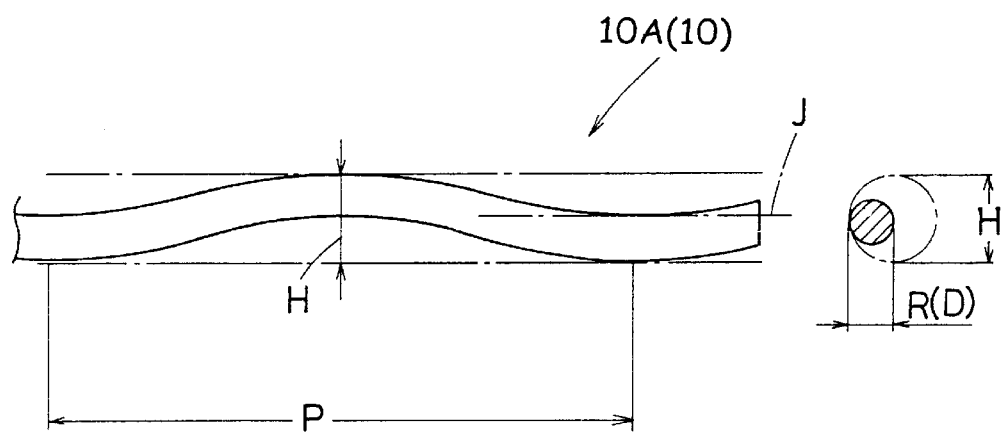

FIG. 15 shows a waved monofilament cord used in the belt shown in FIG. 14 and the wave height and pitch thereof.

Figure 16:
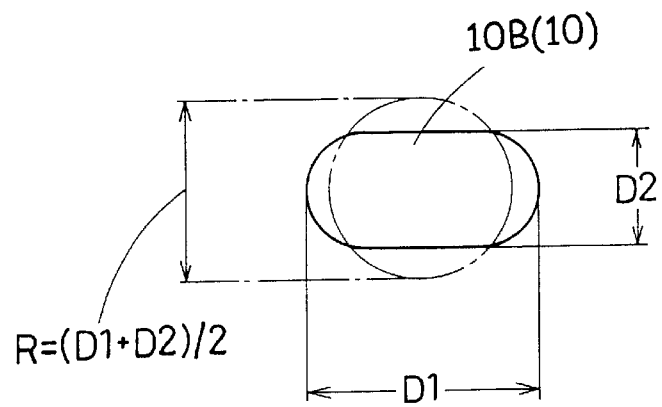

FIG. 16 is a schematic cross sectional view for explaining the average thickness of a waved monofilament cord.

Figure 17:
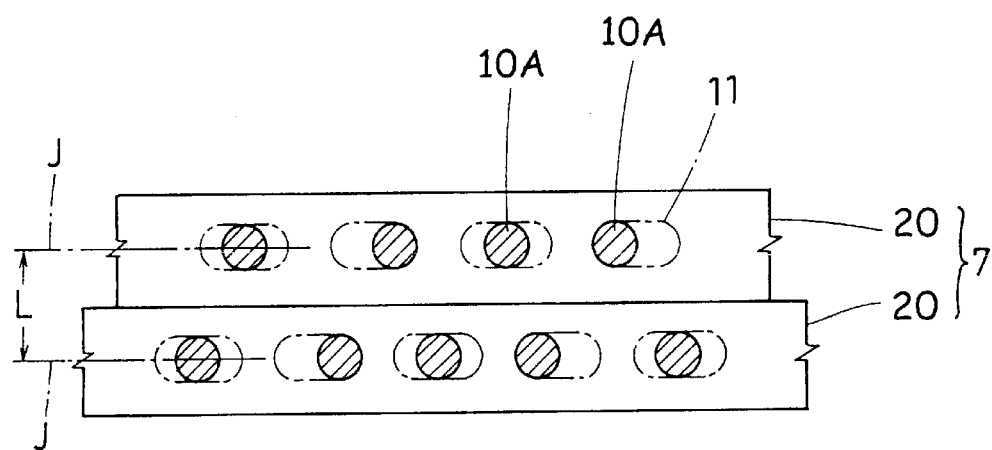

FIG. 17 is a cross sectional view of still another example of the belt.

Figure 18:
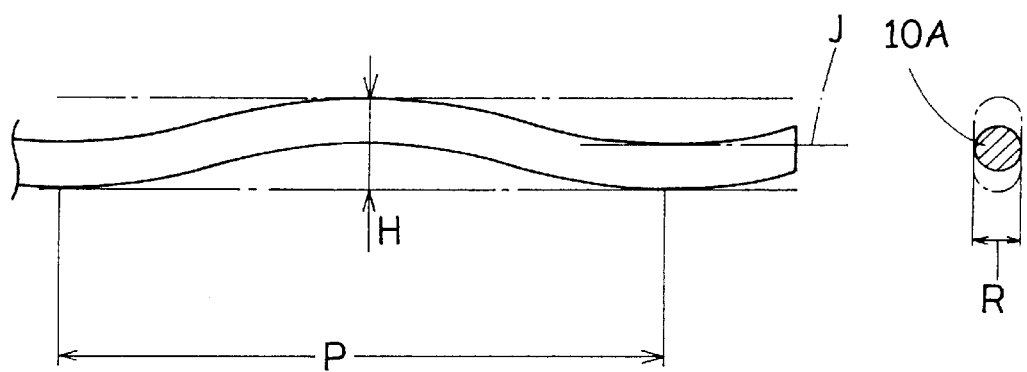
Figure 19:
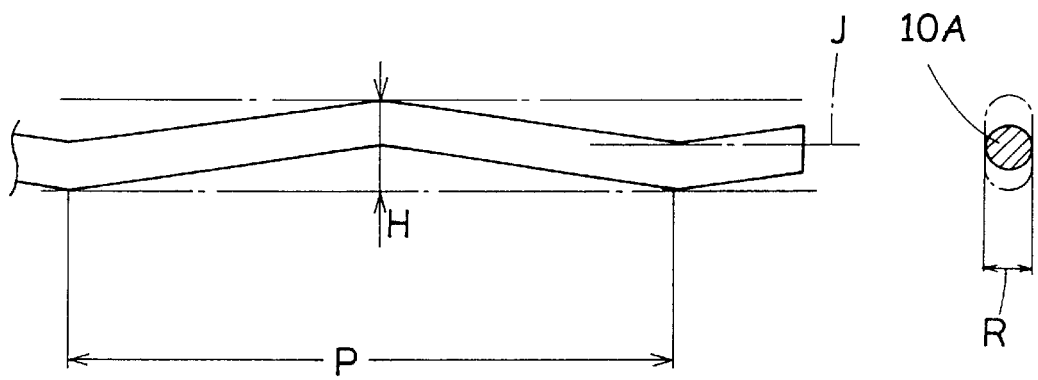

FIGS. 18 and 19 each show a waved monofilament cord usable in the belt shown in FIG. 17 and the wave height and pitch thereof.

Figure 1A:
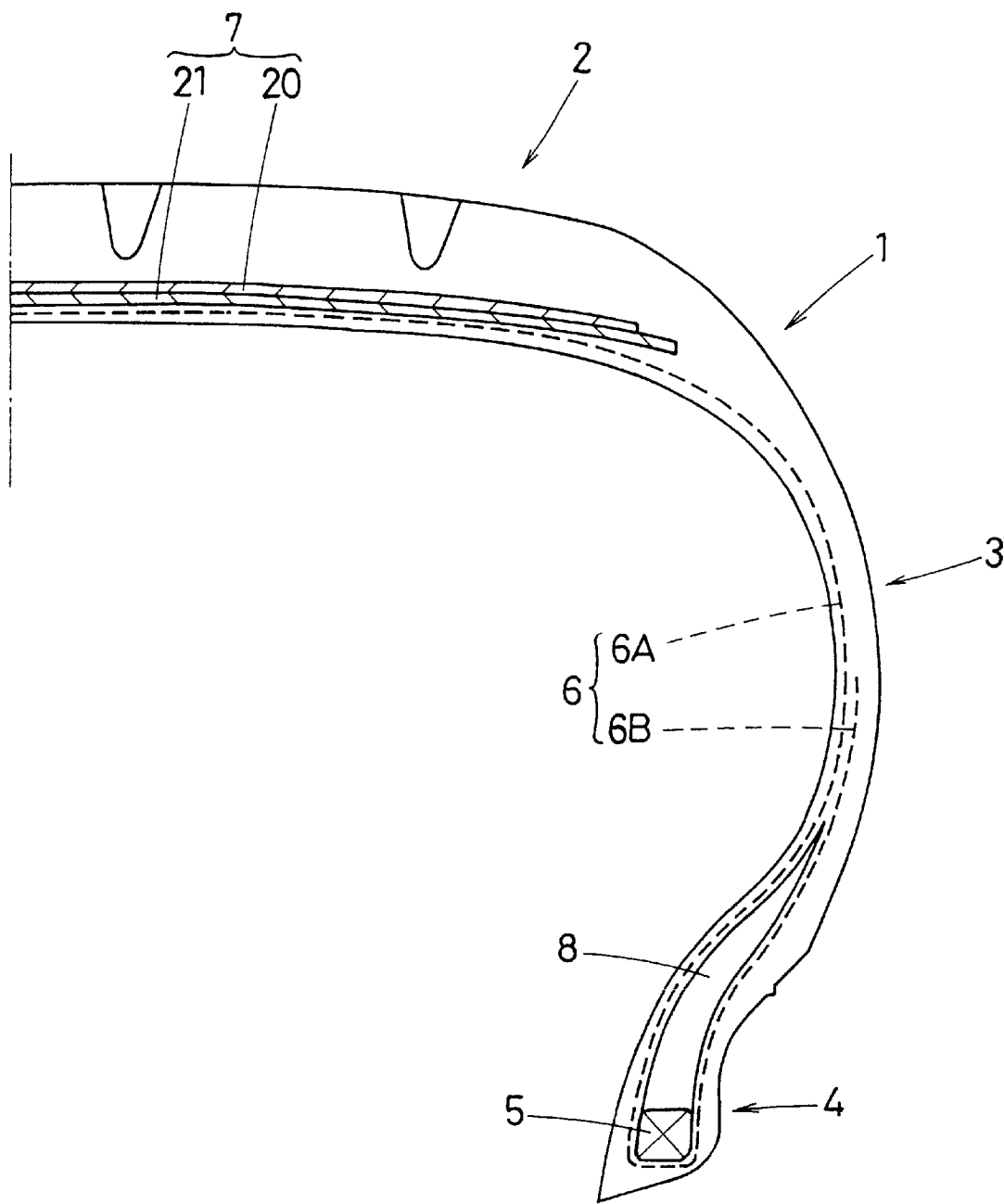
FIGS. 1A, 1B, 1C and 1D are cross sectional views of pneumatic tires according to the present invention.
Figure 1B:
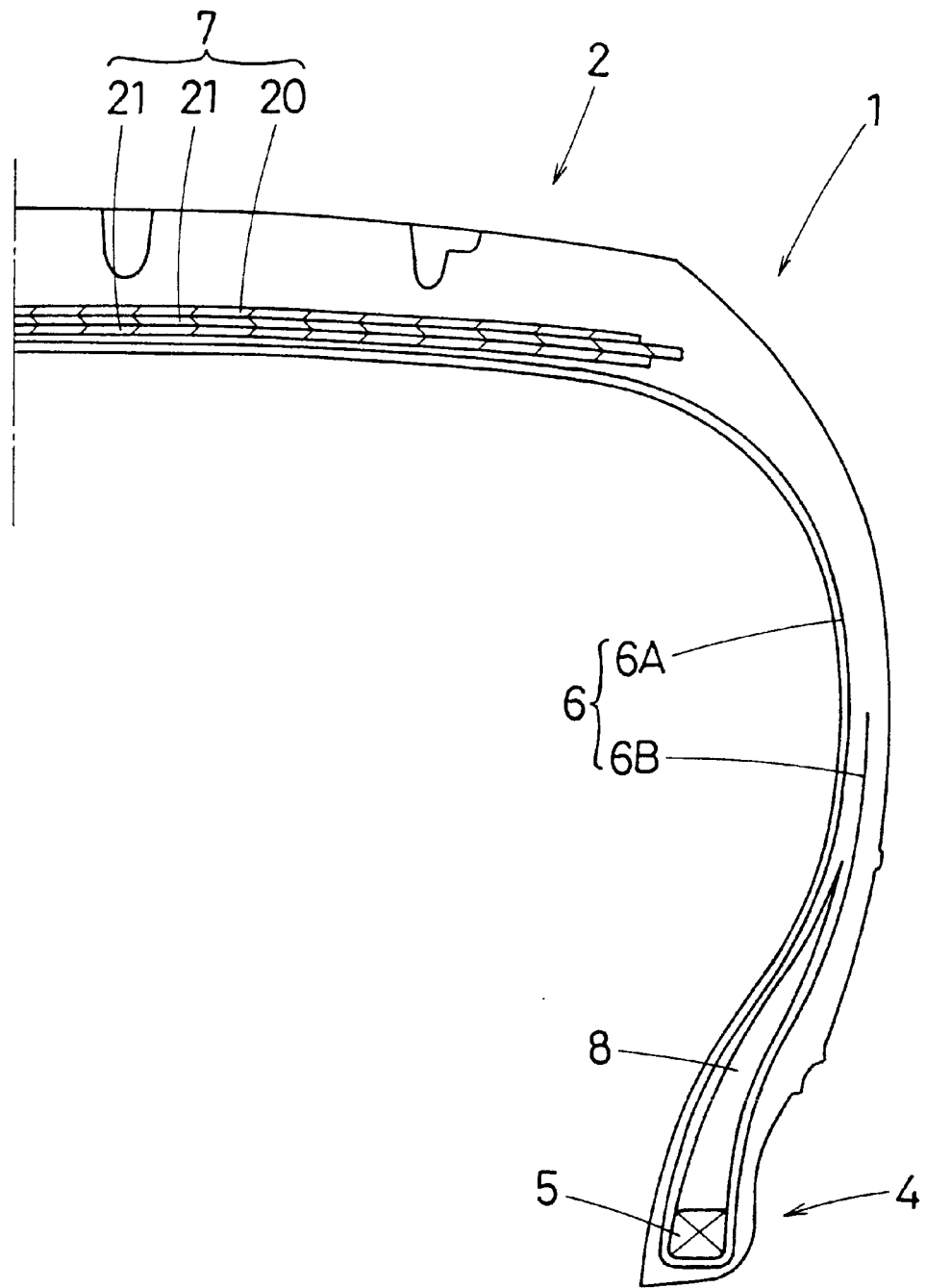
Figure 1C:
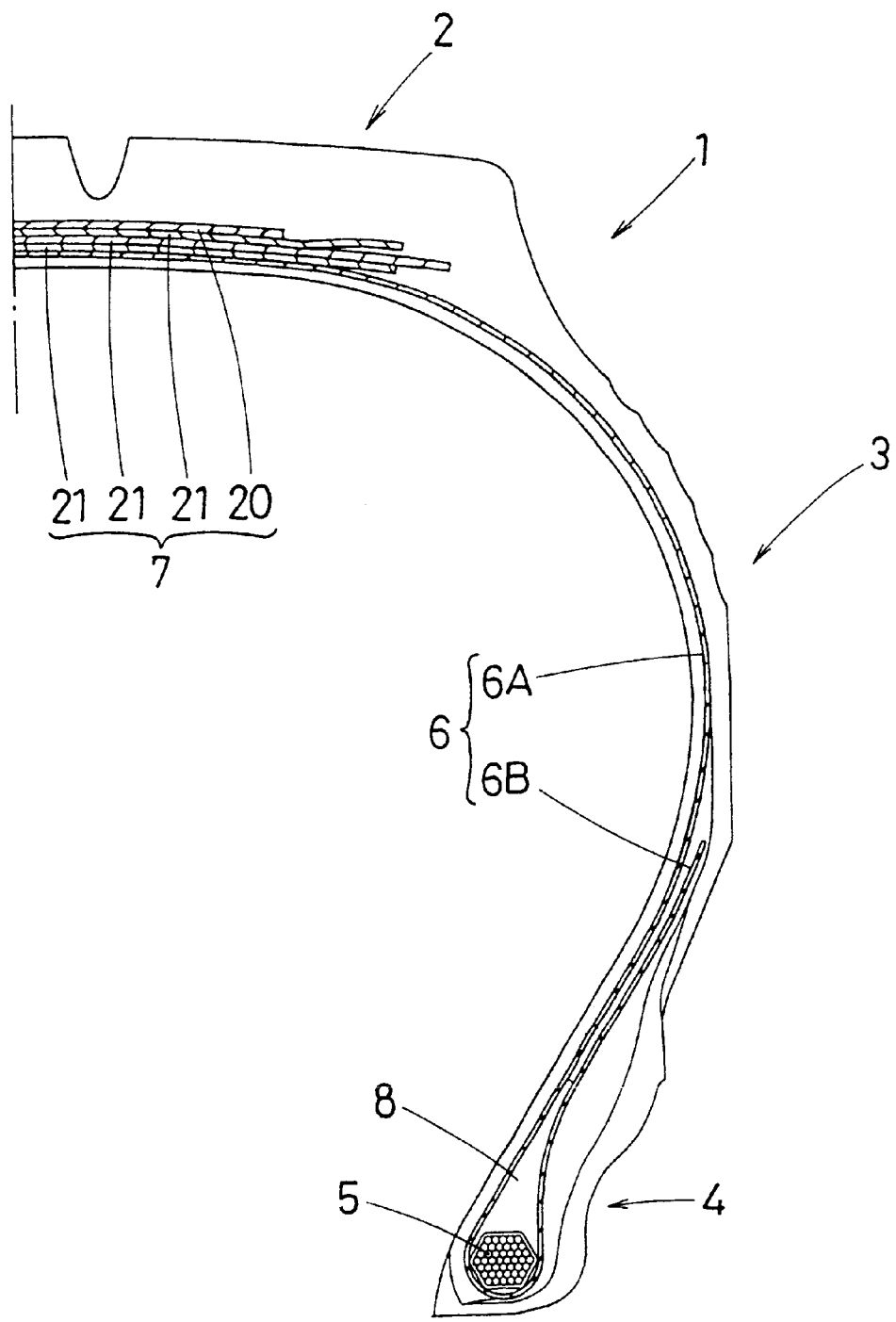
Figure 1D:
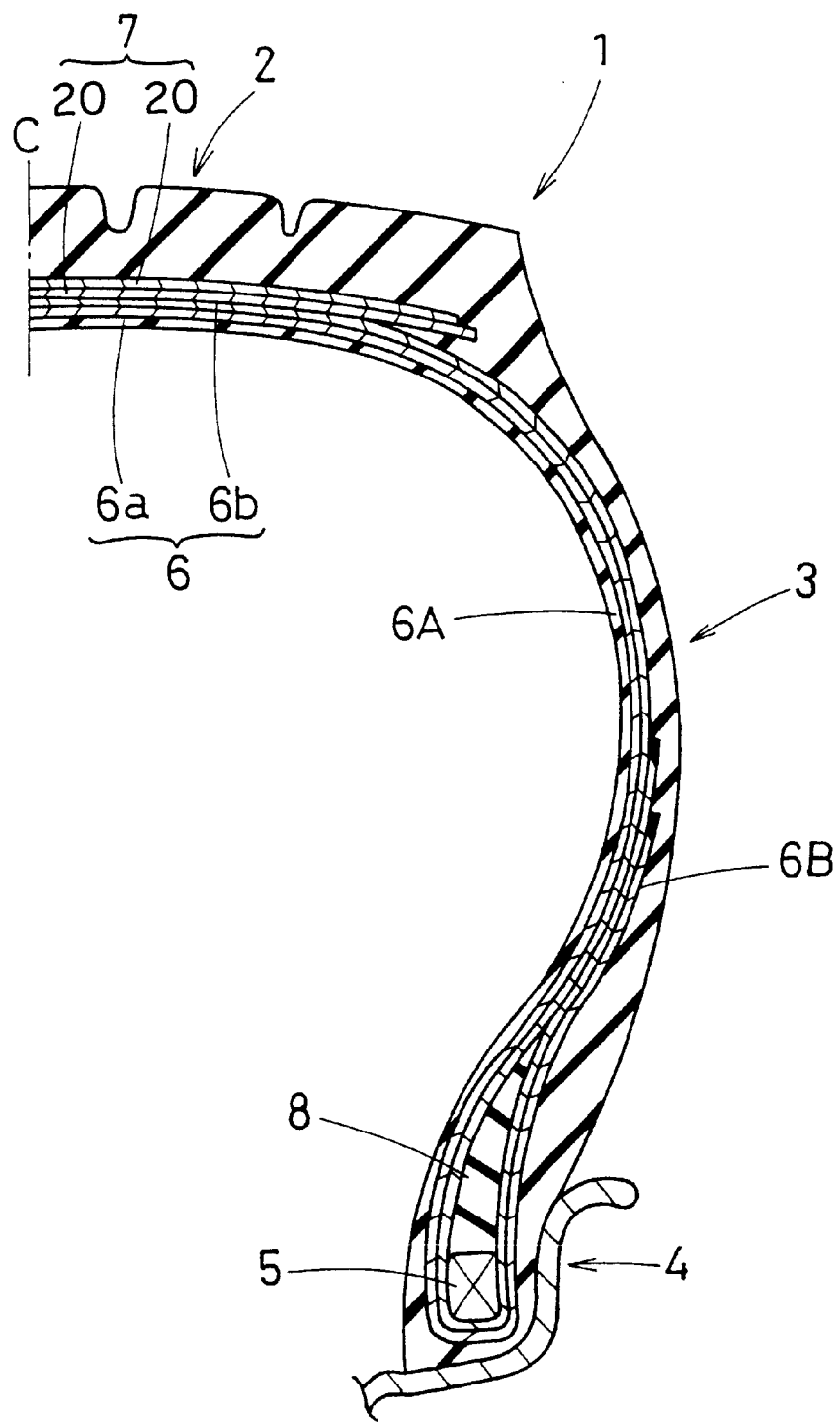

In FIGS. 1A, 1B and 1C showing a passenger car tire, light truck tire and truck-bus tire, respectively, and also in FIG. 1D, each tire according to the present invention comprises a tread portion 2, a pair of sidewall portions 3, a pair of bead portions 4, a carcass 6 extended between the bead portions 4, and a belt 7 disposed radially outside the carcass 6 in the tread portion 2.

The carcass 6 comprises at least one ply of cords arranged at an angle of from 75 to 90 degrees with respect to the circumferential direction of the tire and extending between the bead portions 4 through the tread portion 2 and sidewall portions 3 and turned up around a bead core 5 in each bead portion 4 from the axially inside to the outside of the tire to form a pair of turned up portions 6B and a main portion 6A therebetween. For the carcass cords, organic fiber cords, e.g. nylon, rayon, polyester, aromatic polyamide and the like, composed of a number of filaments twisted together are suitably used. But, multi-filament cords composed of a plurality of steel filaments twisted together may be also used.

Between the main portion 6A and turned up portion 6B in each bead portion, there is disposed a bead apex 8 made of hard rubber extending radially outwardly from the bead core 5, while tapering towards its radially outer end.

In the passenger car tire shown in FIG. 1A, the carcass 6 is composed of a single ply and the belt 7 is composed of two plies 21 and 20: a monofilament cord ply 20 and a multi-filament cord ply 21. In the light truck tire shown in FIG. 1B, the carcass 6 is composed of a single ply and the belt 7 is composed of three plies 21, 21 and 20: two multi-filament cord plies 21 and a monofilament cord ply 20. In the truck-bus tire shown in FIG. 1C, the carcass 6 is composed of a single ply and the belt 7 is composed of four plies 21, 21, 21 and 20: three multi-filament cord plies 21 and a monofilament cord ply 20.

In each example shown in FIGS. 1A, 1B and 1C, the belt 7 comprises at least a monofilament cord ply 20 and a multi-filament cord ply 21 as shown in FIG. 2. And the monofilament cord ply 20 is provided as the radially outermost ply.

The multi-filament cord ply 21 is composed of multi-filament steel cords 11 laid at an inclination angle of from 15 to 70 degrees with respect to the circumferential direction of the tire, and each multi-filament steel cord 11 is made of a plurality of steel filaments 11a twisted together. In FIG. 2, a cord 11 made of five filaments 11a which are twisted together, that is, a cord 11 having a 1×5 structure is used. But, various structures such as 1×4, 1×3, 1×2 structures shown in FIGS. 3A, 3B, 3C, respectively, and further layered structures (not shown) comprising a core filament and at least one sheath made of filaments surrounding the core filament, and the like can be used.

The monofilament cord ply 20 is composed of monofilament steel cords 10 laid at an inclination angle of from 15 to 30 degrees with respect to the circumferential direction of the tire.

By combining the monofilament cord ply 20 with the multi-filament cord ply 21, advantageous effects of the monofilament cords 10 can be obtained, that is, the cord rigidity and belt rigidity can be increased although the total weight of the cords is decreased, therefore both the tire weight and steering stability can be improved, and thus running performance can be improved while maintaining ride comfort. Such effects becomes maximum when the monofilament cord ply 20 is provided as the radially outermost ply.

For the monofilament cords 10, a steel filament whose cross sectional shape is a circle or an oval or a rectangle of which corners are rounded is suitably used. In any case, the cross sectional area S of the filament or cord is set in a range of from 0.09 to 0.30 sq.mm, preferably 0.09 to 0.25 sq.mm. If the cross sectional area S is less than 0.09 sq.mm, the cord rigidity decreases and the cornering power becomes insufficient and it is difficult to maintain steering stability. If the cross sectional area S is less than 0.30 sq.mm, the cord rigidity becomes too high, and it is difficult to provide ride comfort. Further, the cord tends to decrease its durability.

In this example, further, the total cross sectional area of the cords within a unit width of the monofilament cord ply 20 is set in a range of not more than 0.85 times the total cross sectional area of the cords within the unit width of the multi-filament cord ply 21. In case the cord count is constant in the widthwise direction of the ply, the product S×N of the sectional area S of a cord and the cord count N (/5 cm) can be used instead of the total cross sectional area. Here, the direction along which the unit width is measured and the direction in which the cords are count are at a right angle to the longitudinal direction of the cord.

The monofilament cord 10 is waved three-dimensionally (3-D) or two-dimensionally (2-D), whereby the fatigue resistance of the cord is improved, and it becomes possible to adjust the elongation characteristic.

In case of a monofilament cord 10A having a circular sectional shape, spiral (3-D) waving or 2-D waving can be made.

Figure 4:
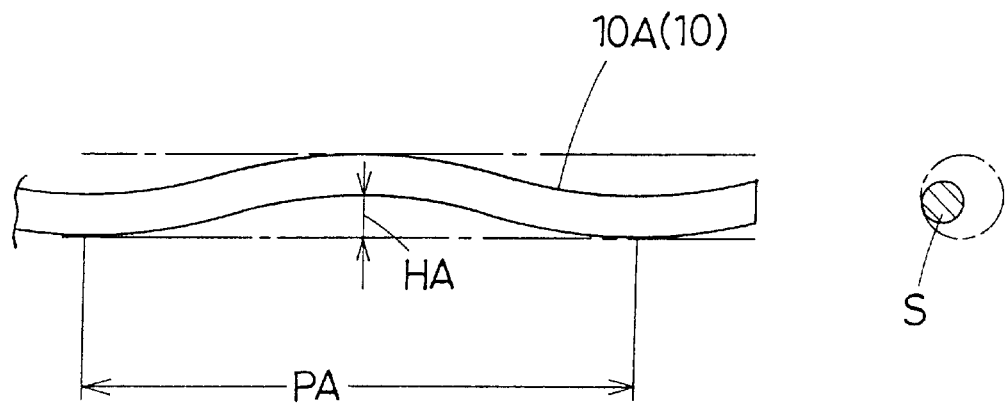
Figure 4:
Figure 5:
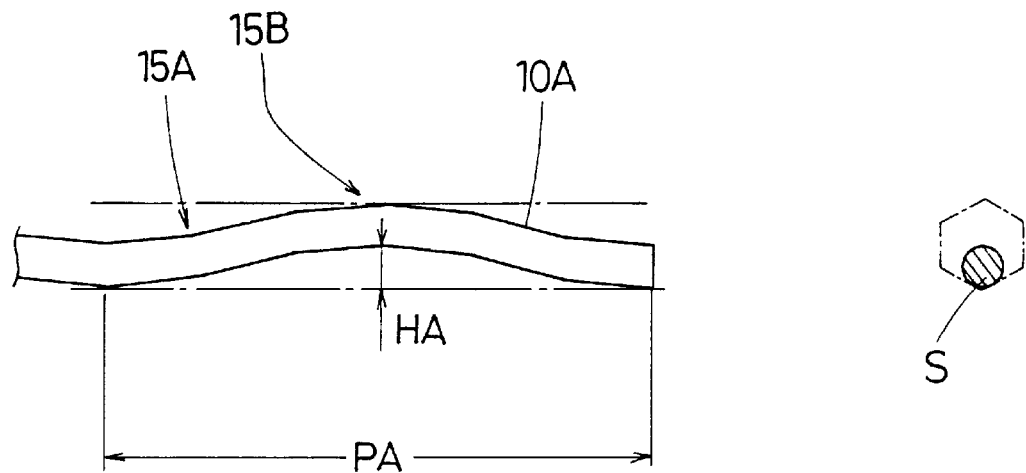
Figure 5:
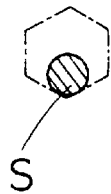

In case of spiral waving, it is possible to use not only a normal spiral without bend of which locus is, as shown in FIG. 4, a circle when viewed in the longitudinal direction, but also a polygonal spiral with bends of which locus is, as shown in FIG. 5, a polygon when viewed in the longitudinal direction.

In case of polygonal spiral waving, the filament may be bent such that longitudinal parts 15B and inclined parts 15A are alternately formed along the length, wherein each longitudinal part 15B extends substantially parallel to the longitudinal direction at one of the vertexes of the polygon, and each inclined part 15A extends between the adjacent longitudinal parts 15B.

In any case, it is preferable that the spiral pitches PA are set in a range of from 14 to 50 mm, and the amplitude HA of a wave is in a range of 0.002 to 0.02 times the pitch PA of the wave.

Figure 6:
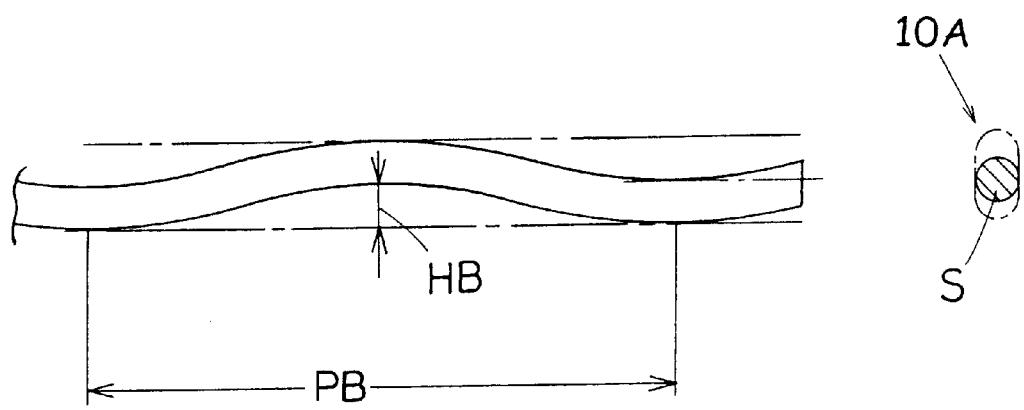
Figure 7:
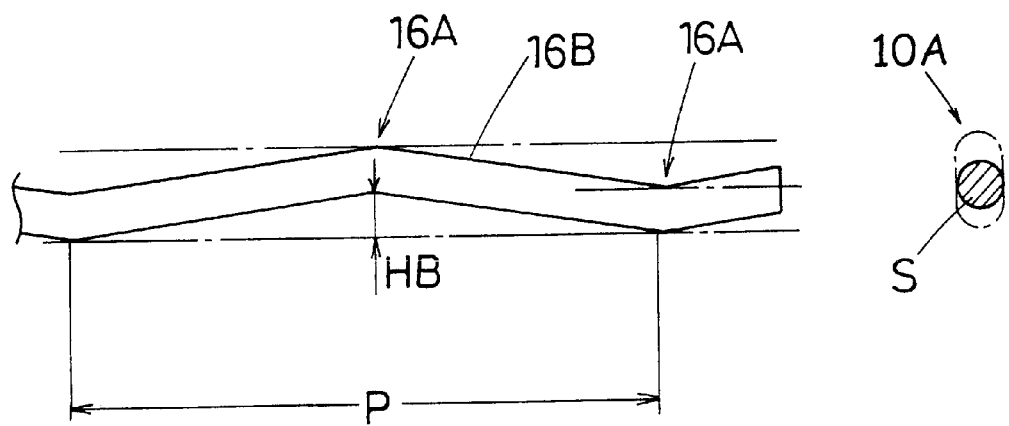

On the other hand, in case of 2D-waving, a curved wave without bend such as sine curve as shown in FIG. 6, and a bent wave with bends such as zigzag as shown in FIG. 7 can be used. Preferably, the pitches PB of the 2D-waves are set in a range of from 5 to 50 mm, and the amplitude HB of a wave is set in a range of from 0.002 to 0.05 times the pitch PB of the wave.

Figure 8:
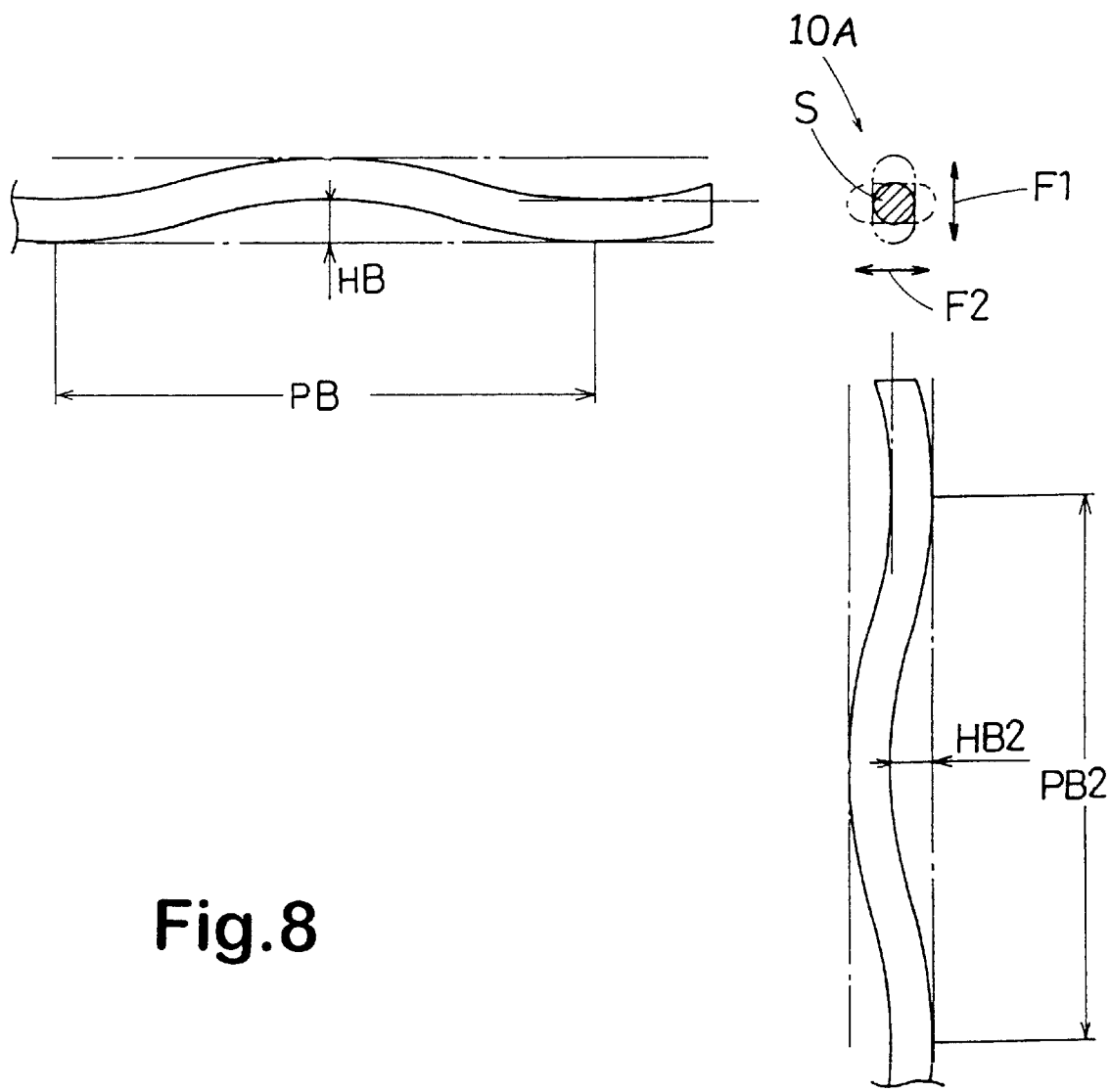

FIG. 8 shows a 3-D waving other than the spiral waving, wherein the filament 10A is waved in two orthogonal directions F1 and F2. In a plane parallel to the direction F1, the pitches PB are a constant value in a range of from 5 to 50 mm, and the amplitude HB are a constant value in a range of from 0.002 to 0.05 times the pitch PB. In a plane parallel to the direction F2, the pitches PB2 are a constant value in a range of from 5 to 50 mm but different from the pitch PB, and the amplitude HB2 are a constant value in a range of from 0.002 to 0.05 times the pitch PB2 but different from the amplitude HB.

Besides the above-mentioned monofilament cord 10A whose cross sectional shape is a circle, a monofilament cord 10B whose cross sectional shape is an oval or a rectangle of which corners are rounded as shown in FIGS. 9–13, can be suitably used, wherein the aspect ratio Dh/Dw of the cross sectional shape is preferably set in a range of from 0.65 to 0.95.

In a belt ply, such monofilament cords 10B are disposed so that their minor axes extend along the thickness direction of the belt ply 20 or the radial direction of the tire. Therefore, in comparison with the circular cross sectional shape, the inplane rigidity of the belt 7 is increased, but the out-of-plane rigidity is decreased. As a result, the cornering power can be increased to improve the steering stability, without deteriorating ride comfort. If the aspect ratio Dh/Dw is less than 0.65, the strength is liable to become insufficient.

Figure 9:
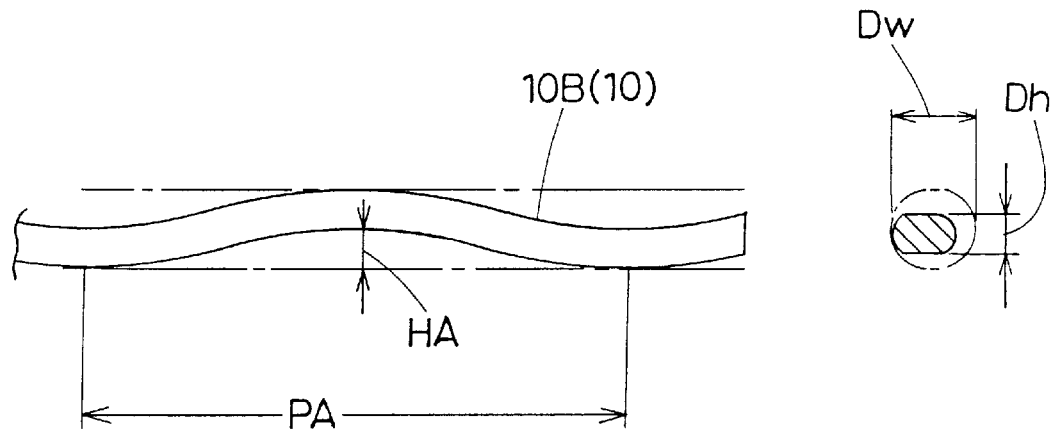
Figure 10:
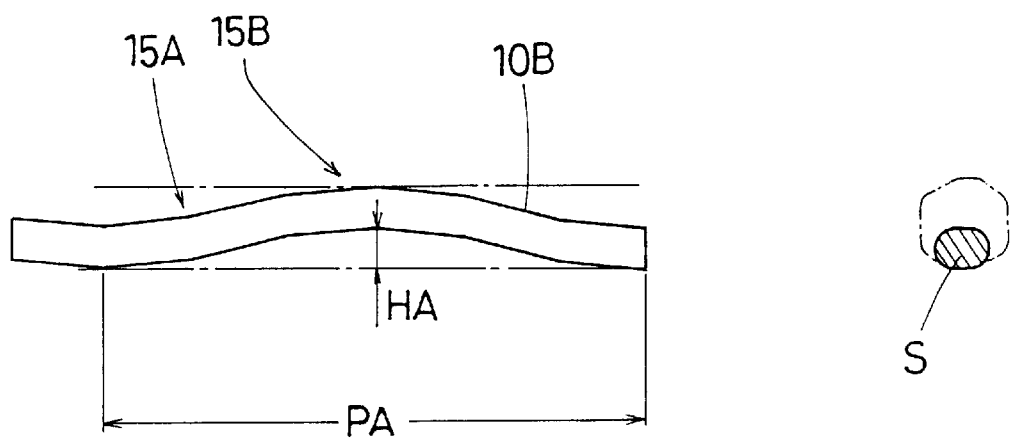
Figure 11:
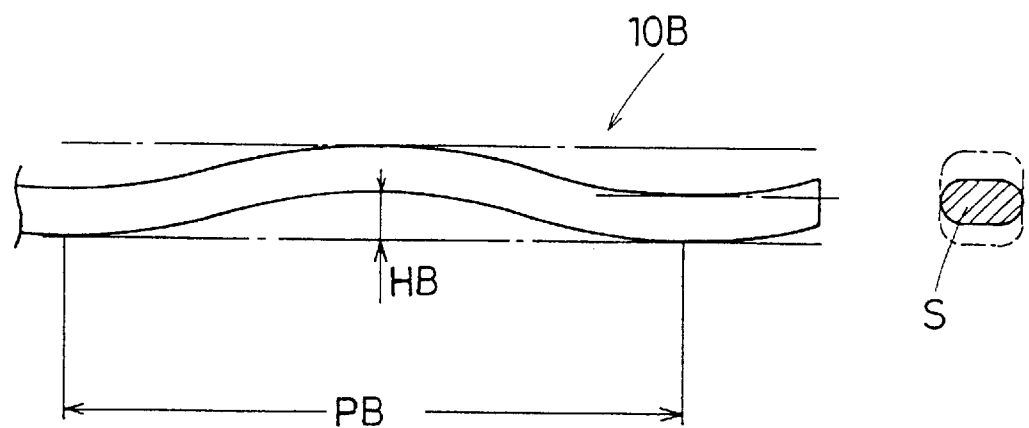
Figure 12:
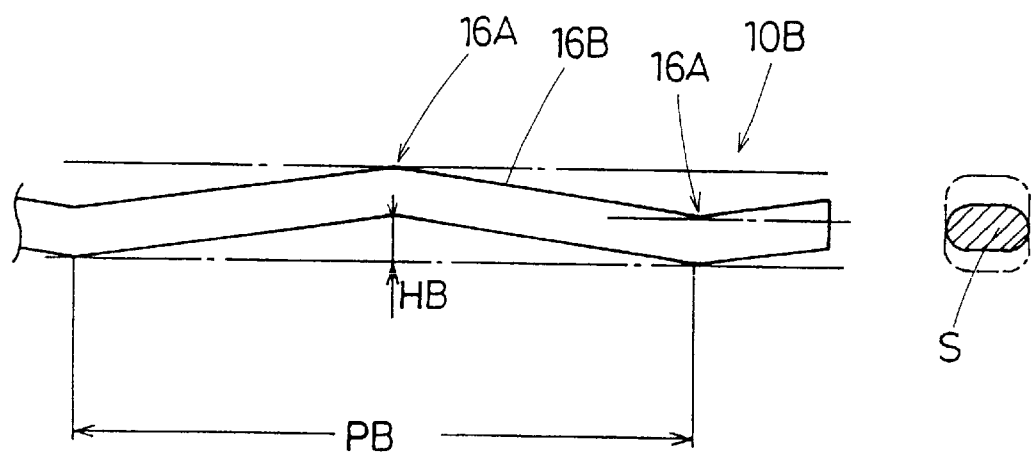
Figure 13:
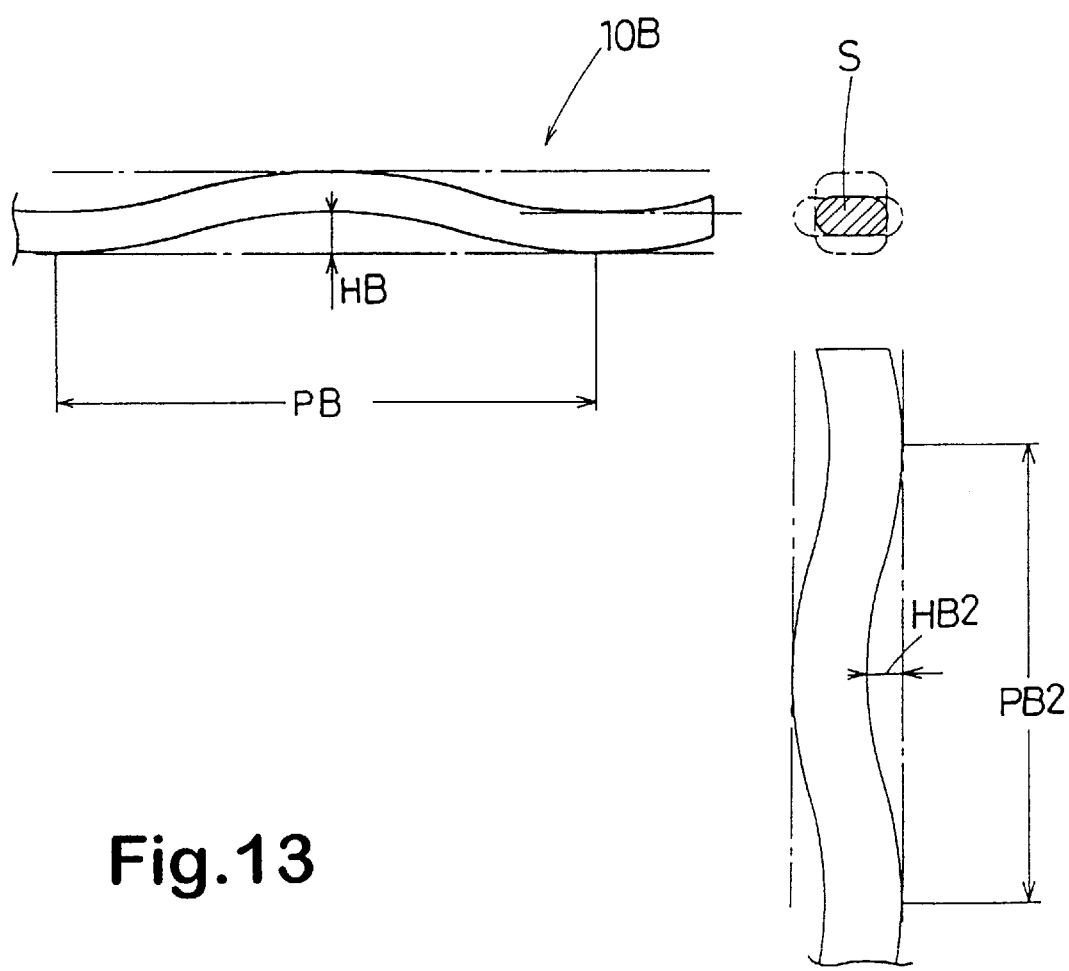

In the same manner as explained above, such a low aspect ratio monofilament cord 10B can be waved spirally or two-dimensionally as follows:

In the spiral waving, a normal spiral without bend as shown in FIG. 9, and a polygonal spiral with bends as shown in FIG. 10 can be used. Preferably, the spiral pitches PA are set in a range of from 14 to 50 mm, and the amplitude HA of a wave is set in a range of from 0.002 to 0.02 times the pitch PA of the wave. In the 2D-waving, a curved wave without bend such as sine curve as shown in FIG. 11 and a bent wave with bends such as zigzag as shown in FIG. 12 can be used. Preferably, the pitches PB of the 2D-waves are set in a range of from 5 to 50 mm, and the amplitude HB of a wave is set in a range of from 0.002 to 0.05 times the pitch PB of the wave. Usually, the 2-D waving is made within a plane parallel to the minor axis as shown in FIGS. 11 and 12. But, it may be also possible to make the 2-D waving in a plane parallel to the major axis. Further, as explained in the monofilament cord 10A having a circular cross section, the orthogonal waving is also possible as shown in FIG. 13. The amplitudes HB and HB2 and the pitches PB and PB2 are limited as explained above.

On the other hand, in order to further improve the high-speed durability of the belt, a band (not shown) which covers at least edge portions of the belt 7 can be disposed radially outside the belt 7. Here, the band is a cord layer made of at least one cord spirally wound, or parallel cords laid at substantially parallel to the tire circumferential direction, that is, a cord layer of which cord inclination is about 0 to 5 degrees with respect to the circumferential direction of the tire. For example, a band composed of a single band ply of spirally wound nylon fiber cords is used.

If the pitches PA are less than 14 mm or the pitches PB and PB2 are less than 5 mm, the durability of the cord decrease. If the amplitudes HA, HB and HB2 are more than 0.02×PA, 0.05×PB and 0.05×PB2, respectively, the strength of fatigue resistance of the cord are liable to decrease.

Comparison Test 1

Passenger car tires (size 205/65R15) shown in FIG. 1A having specifications shown in Tables 1 and 2, and light-truck tires (size 205/85R16 117/115L) shown in FIG. 1B and truck-bus tires (size 11R22.5) shown in FIG. 1C having specifications shown in Table 3 were made and tested for durability, steering stability and ride comfort.

The results are shown in Tables 1, 2 and 3.
1) Tire Weight
The tire weight is indicated by an index based on the prior art tire being 100.
2) Durability Test
In case of passenger car tires, 8-turn (diameter 14 meters) was made 500 times, using a 3000 cc passenger car provided on all the wheels with the test tires. (Wheel rim size 15×6JJ, Tire pressure 200 kPa)

In case of light-truck tires, a light-truck provided on all the wheels with the test tires was run on bad roads for 20,000 km. (Wheel rim size 16×6K, Tire pressure 600 kPa)

In case of heavy duty tires, a truck provided on all the wheels with the test tires was run on bad roads for 20,000 km. (Wheel rim size 22.5×8.25, Tire pressure 800 kPa)

Then, the test tires were cut-open inspected for broken belt cords, and the number of broken points was counted. The results are indicated by an index based on the prior art tire being 100.

3) Steering Stability Test

The test cars (passenger car, light-truck and truck) were run on a dry asphalt road of a tire test course, and the test driver evaluated the steering stability into ten ranks from the steering response, rigidity, road grip and the like. The larger the rank number, the better the steering stability.

4) Ride Comfort Test

The test cars were run on dry rough roads of the tire test course (including uneven asphalt road, stone-paved road and graveled road), and the test driver evaluated ride comfort into ten ranks from the harshness, thrust, damping and the like. The larger the rank number, the better the ride.

TABLE 1

| Tire | prior 1 | Ref.1 | Ref.2 | Ex.1 | Ex.2 | Ex.3 | Ex.4 | Ex.5 |
|---|---|---|---|---|---|---|---|---|
| Tire size | 205/65R15 | 205/65R15 | 205/65R15 | 205/65R15 | 205/65R15 | 205/65R15 | 205/65R15 | 205/65R15 |
| Belt | 2 plies | 2 plies | 2 plies | 2 plies | 2 plies | 2 plies | 2 plies | 2 plies |
| Outer belt ply | | | | | | | | |
| Monofilament cord | | | | | | | | |
| Cord structure | 1 × 5 × 0.25 | 1 × 1 × 0.65 | 1 × 1 × 0.42 | 1 × 1 × 0.38 | 1 × 5 × 0.25 | 1 × 1 × 0.42 | 1 × 1 × 0.42 | 1 × 1 × 0.42 |
| Sectional shape | — | circle | circle | circle | circle | circle | circle | circle |
| Sectional area S (sq. mm) | — | 0.332 | 0.139 | 0.113 | 0.139 | 0.139 | 0.139 | 0.139 |
| Waving | — | spiral | spiral | spiral | spiral | spiral | spiral | 2-D |
| Bend | — | none | none | none | none | none | present | none |
| Pitch PA (mm) | — | 30 | 20 | 19 | 20 | 20 | 20 | — |
| Amplitude HA (mm) | — | 0.28 | 0.5 | 0.17 | 0.18 | 0.18 | 0.18 | — |
| HA/PA | — | 0.009 | 0.025 | 0.009 | 0.009 | 0.009 | 0.009 | — |
| Pitch PB (mm) | — | — | — | — | — | — | — | 20 |
| Amplitude HB (mm) | — | — | — | — | — | — | — | 0.18 |
| HB/PB | — | — | — | — | — | — | — | 0.009 |
| Bending rigidity M (g cm) | | 207 | 42 | 29 | 42 | 42 | 42 | 42 |
| Cord count N (/5 cm) | | 26 | 40 | 44 | 40 | 40 | 40 | 40 |
| SXN (cord weight index) | — | 8.632 | 5.56 | 4.972 | 5.56 | 5.56 | 5.56 | 5.56 |
| MXN (cord rigidity index) | — | 5382 | 1680 | 1276 | 1680 | 1680 | 1680 | 1680 |
| Inner belt ply | | | | | | | | |
| Multi-filament cord | | | | | | | | |
| Cord structure | 1 × 5 × 0.25 | 1 × 5 × 0.25 | 1 × 5 × 0.25 | 1 × 5 × 0.25 | 1 × 1 × 0.42 | 1 × 5 × 0.25 | 1 × 5 × 0.25 | 1 × 5 × 0.25 |
| Sectional area S (sq. mm) | 0.245 | 0.245 | 0.245 | 0.245 | 0.245 | 0.245 | 0.245 | 0.245 |
| Bending rigidity M (g cm) | 28 | 28 | 28 | 28 | 28 | 26 | 28 | 28 |
| Cord count N (/cm) | 35 | 35 | 35 | 35 | 35 | 35 | 35 | 35 |
| SXN (cord weight index) | 8.575 | 8.575 | 8.575 | 8.575 | 8.575 | 8.575 | 8.575 | 8.575 |
| MXN (cord rigidity index) | 980 | 980 | 980 | 980 | 980 | 980 | 980 | 980 |
| Tire weight | 100 | 102 | 97 | 94 | 95 | 96 | 96 | 96 |
| Durability | 100 | 104 | 200 | 96 | 88 | 85 | 87 | 86 |
| Steering stability | 7 | 9 | 7 | 8 | 8 | 9 | 9 | 9 |
| Ride comfort | 7 | 4 | 8 | 8 | 8 | 8 | 8 | 8 |

TABLE 2

| | Tire | | | | | |
|---|---|---|---|---|---|---|
| | Ref. 3 | Ex. 6 | Ex. 7 | Ex. 8 | Ex. 9 | Ex. 10 |
| Tire size | 205/65R15 | 205/65R15 | 205/65R15 | 205/65R15 | 205/65R15 | 205/65R15 |
| Belt | 2 plies | 2 plies | 2 plies | 2 plies | 2 plies | 2 plies |
| Outer belt ply | | | | | | |
| Monofilament cord | | | | | | |
| Cord structure | 1 × 1 | 1 × 1 | 1 × 1 | 1 × 1 | 1 × 1 × 0.55 | 1 × 1 × 0.42 |
| Sectional shape | oval | oval | oval | oval | circle | circle |
| Sectional area S (sq. mm) | 0.139 | 0.139 | 0.139 | 0.139 | 0.238 | 0.139 |
| Waving | 2-D | spiral | 2-D | FIG. 14 | spiral | spiral |
| Bend | none | none | none | none | none | none |
| Pitch PA (mm) | — | 20 | 20 | — | 21 | 20 |
| Amplitude HA (mm) | — | 0.18 | 0.18 | — | 0.19 | 0.18 |
| HA/PA | — | 0.009 | 0.009 | — | 0.009 | 0.009 |
| Pitch PB (mm) | 20 | — | 20 | 20 | — | — |
| Amplitude HB (mm) | 0.5 | — | 0.18 | 0.18 | — | — |
| HB/PB | 0.025 | — | 0.009 | 0.009 | — | — |
| Pitch PB2 (mm) | — | — | — | 20 | — | — |
| Amplitude HB2 (mm) | — | — | — | 0.18 | — | — |
| HB2/PB2 | — | — | — | 0.009 | — | — |

TABLE 2-continued

| | Tire | | | | | |
|---|---|---|---|---|---|---|
| | Ref. 3 | Ex. 6 | Ex. 7 | Ex. 8 | Ex. 9 | Ex. 10 |
| Bending rigidity M (g cm) | 39 | 39 | 39 | 39 | 100 | 42 |
| Cord count N (/5 cm) | 40 | 40 | 40 | 40 | 28 | 40 |
| S × N (cord weight index) | 5.56 | 5.56 | 5.56 | 5.56 | 6.664 | 5.56 |
| M × N (cord rigidity index) | 1560 | 1560 | 1560 | 1560 | 2800 | 1680 |
| Inner belt ply | | | | | | |
| Multi-filament cord | | | | | | |
| Cord structure | 1 × 5 × 0.25 | 1 × 5 × 0.25 | 1 × 5 × 0.25 | 1 × 5 × 0.25 | 1 × 5 × 0.25 | 1 × 3 × 0.27 |
| Sectional area S (sq. mm) | 0.245 | 0.245 | 0.245 | 0.245 | 0.245 | 0.245 |
| Bending rigidity M (g cm) | 28 | 28 | 28 | 28 | 28 | 28 |
| Cord count N (/cm) | 35 | 35 | 35 | 35 | 35 | 35 |
| S × N (cord weight index) | 8.575 | 8.575 | 8.575 | 8.575 | 8.575 | 8.575 |
| M × N (cord rigidity index) | 980 | 980 | 980 | 980 | 980 | 980 |
| Tire weight | 97 | 96 | 96 | 96 | 96 | 96 |
| Durability | 240 | 89 | 89 | 89 | 79 | 88 |
| Steering stability | 7 | 10 | 10 | 10 | 9 | 9 |
| Ride comfort | 8 | 8 | 8 | 8 | 6 | 9 |

TABLE 3

| | Tire | | | |
|---|---|---|---|---|
| | Prior 2 | Ex. 11 | Prior 3 | Ex. 12 |
| Tire size | 205/85R16 | 205/85R16 | 11R22.5 | 11R22.5 |
| Belt | 3 plies | 3 plies | 4 plies | 4 plies |
| Outermost belt ply | | | | |
| Multi-filament cord | | none | | none |
| Cord structure | 3 × 0.175 + 6 × 0.32 | | 3 × 0.20 + 6 × 0.35 | |
| Monofilament cord | none | | none | |
| Cord structure | | 1 × 1 × 0.60 | | 1 × 1 × 0.60 |
| Sectional shape | — | circle | — | circle |
| Sectional area S (sq. mm) | — | 0.283 | — | 0.283 |
| Waving | | spiral | | spiral |
| Bend | — | none | — | none |
| Pitch PA (mm) | — | 28 | — | 28 |
| Amplitude HA (mm) | — | 0.26 | — | 0.26 |
| HA/PA | — | 0.009 | — | 0.009 |
| Bending rigidity M (g cm) | — | 159 | — | 159 |
| Cord count N (/5 cm) | — | 37 | — | 37 |
| S × N (cord weight index) | — | 10.471 | — | 10.471 |
| M × N (cord rigidity index) | — | 5883 | — | 5883 |
| Inner belt plis | | | | |
| Multi-filament cord | | | | |
| Cord structure | | | | |
| 3rd belt ply | — | — | 3 × 0.20 + 6 × 0.35 | 3 × 0.20 + 6 × 0.35 |
| 2nd belt ply | 3 × 0.175 + 6 × 0.32 | 3 × 0.175 + 6 × 0.32 | 3 × 0.20 + 6 × 0.35 | 3 × 0.20 + 6 × 0.35 |
| Innermost belt ply | 3 × 0.175 + 6 × 0.32 | 3 × 0.175 + 6 × 0.32 | 3 × 0.20 + 6 × 0.35 | 3 × 0.20 + 6 × 0.35 |
| Section area S (sq. mm) | 0.555 | 0.555 | 0.672 | 0.672 |
| Bending rigidity M (g cm) | 91 | 91 | 130 | 130 |
| Cord count N (/5 cm) | 26 | 26 | 26 | 26 |
| S × N (cord weight index) | 14.43 | 14.43 | 17.472 | 17.472 |
| M × N (cord rigidity index) | 2366 | 2366 | 3380 | 3380 |
| Tire weight | 100 | 96 | 100 | 98 |
| Durability | 100 | 64 | 100 | 73 |
| Steering stability | 7 | 9 | 7 | 8 |
| Ride comfort | 7 | 8 | 7 | 8 |

FIG. 1D shows a radial tire for passenger cars according to the present invention, wherein the carcass 6 comprises two plies 6a and 6b, and the belt 7 comprises at least two cross plies 7a and 7b all of which are a waved monofilament cord ply 20 as shown in FIGS. 14 and 17. That is, The belt 7 is composed of waved monofilament cords 10 (10A, 10B) only.

In this example, the belt 7 consists of two plies each made of the cords laid at an angle of from 15 to 30 degrees with respect to the circumferential direction of the tire.

In FIG. 14, each of the waved monofilament cord plies 20 is made of waved monofilament cords 10A having a circular cross sectional shape and waved spirally. The spiral pitches P are in a range of from 0.008 to 0.08 times, preferably 0.010 to 0.060 times the circumference W of the tire measured along the tire equator C under a standard inflated condition. And the height H of a wave which corresponds to the outer diameter of the spiral is preferably set in a range of from 0.002 to 0.025 times, preferably 0.010 to 0.020 times the pitch P of the wave. The ratio H/P of the wave height H to the pitch P of a wave is substantially constant in the tire circumferential direction. For example, in case of passenger tires, the spiral pitch P is 20 to 100 mm and the wave height H is 0.10 to 0.20 mm. In case of light-truck tires, the pitch P is 40 to 120 mm and the wave height H is 0.13 to 0.25 mm. In case of truck-bus tires, usually, the pitch P is 60 to 140 mm and the wave height H is 0.16 to 0.30 mm.

The above-mentioned standard inflated condition is that the tire is mounted on a standard wheel rim and inflated to a standard inner pressure but loaded with no tire load. The standard rim is the "standard rim" specified in JATMA, the "Measuring Rim" in ETRTO, the "Design Rim" in T&RA or the like. The standard pressure is the "maximum air pressure" in JATMA, the "Inflation Pressure" in ETRTO, the maximum pressure given in the "Tire Load Limits at Various Cold Inflation Pressures" table in T&RA or the like. In case of passenger car tires, however, 180 kPa is used as the standard pressure.

Further, the average thickness R of the waved monofilament cord 10 is set in a range of from $0.13 \times 10^{-3}$ to $0.28 \times 10^{-3}$ times, preferably $0.18 \times 10^{-3}$ to $0.25 \times 10^{-3}$ times the tire circumference W to provide a necessary rigidity for the belt. Usually, the average thickness R is 0.38 to 0.46 mm in case of passenger tires. In case of light-truck tires, the average thickness R is 0.46 to 0.54 mm. In case of truck-bus tires, the average thickness R is 0.54 to 0.70 mm. Here, the average thickness R means, 1) the diameter D in case the cord section is a circle, 2) the average (D1+D2)/2 of a thickness D1 along the major axis and a thickness D2 along the minor axis in case of a low aspect ratio cross section as shown in FIG. 16.

Besides the above-mentioned spiral waving, as shown in FIGS. 18 and 19, 2-D waving can be made for the waved monofilament cord 10. In this case, the cord 10 is waved in a plane parallel to the tread face as shown in FIG. 17. Curved waves not including a straight part such as sine curve as shown in FIG. 18 and zigzag waves including straight parts as shown in FIG. 19 can be used. The pitches P and wave heights H of the waves and the average cord thickness R are limited in the same manner as the spirally waved monofilament cord 10.

If the pitches P are less than 0.008 times the tire circumference W, steering stability deteriorates. If the wave height H is more than 0.025 times the pitch P, the strength and fatigue resistance of the cord decrease, and a ply separation failure becomes liable to occur. If the average thickness R is less than $0.13 \times 10^{-3}$ times the tire circumference W, it becomes difficult to obtain a necessary cornering power. If the average thickness R is more than $0.28 \times 10^{-3}$ times the tire circumference W, the cord durability decreases and ride comfort is deteriorated Comparison Test 2

Passenger car tires (size 175/70R13), light-truck tires (size 275/70R16) and truck-bus tires (size 11R22.5) having the structure shown in FIG. 1D and specifications shown in Tables 4 and 5 were made and tested in the same manner as above.

The results are shown in Tables 4 and 5.

TABLE 4

| | Tire | | | | | | | |
|---|---|---|---|---|---|---|---|---|
| | Prior 1 | Ref. 1 | Ref. 2 | Ref. 3 | Ex. 1 | Ex. 2 | Ex. 3 | Ex. 4 |
| Tire size | 175/70R13 | 175/70R13 | 175/70R13 | 175/70R13 | 175/70R13 | 175/70R13 | 175/70R13 | 175/70R13 |
| Circumference W (mm) | 1810 | 1810 | 1810 | 1810 | 1810 | 1810 | 1810 | 1810 |
| Belt | 2 plies | 2 plies | 2 plies | 2 plies | 2 plies | 2 plies | 2 plies | 2 plies |
| Cord structure | 1 × 5 × 0.25 | 1 × 1 × 0.40 | 1 × 1 × 0.40 | 1 × 1 × 0.40 | 1 × 1 × 0.40 | 1 × 1 × 0.40 | 1 × 1 × 0.40 | 1 × 1 × 0.40 |
| Waving | none | FIG. 15 | FIG. 15 | none | FIG. 15 | FIG. 15 | FIG. 15 | FIG. 15 |
| Pitch P (mm) | — | 10 | 160 | — | 16 | 40 | 80 | 130 |
| P/W | — | 0.006 | 0.088 | — | 0.009 | 0.022 | 0.044 | 0.072 |
| Height H (mm) | — | 0.18 | 0.26 | — | 0.03 | 0.08 | 0.13 | 0.25 |
| H/P | — | 0.018 | 0.0016 | — | 0.0019 | 0.002 | 0.0016 | 0.0019 |
| Average thickness R (mm) | 0.25 | 0.4 | 0.4 | 0.4 | 0.4 | 0.4 | 0.4 | 0.4 |
| R/W | — | 0.00022 | 0.00022 | — | 0.00022 | 0.00022 | 0.00022 | 0.00022 |
| Cord count/5 cm | 30 | 40 | 40 | 40 | 40 | 40 | 40 | 40 |
| Tire weight | 100 | 92 | 92 | 92 | 92 | 92 | 92 | 92 |
| Durability | 100 | 85 | 83 | 80 | 100 | 101 | 100 | 100 |
| Steering stability | 7 | 5 | 8 | 7 | 7 | 8 | 9 | 9 |
| Ride comfort | 7 | 8 | 5 | 5 | 8 | 8 | 8 | 7 |

TABLE 5

| | Tire | | | | | | | |
|---|---|---|---|---|---|---|---|---|
| | Ex. 5 | Ex. 6 | prior 2 | Ref. 4 | Ex. 7 | prior 3 | Ref. 5 | Ex. 8 |
| Tire size | 175/70R13 | 175/70R13 | 275/70R16 | 275/70R16 | 275/70R16 | 11R22.5 | 11R22.5 | 11R22.5 |
| Circumference W (mm) | 1810 | 1810 | 2489 | 2489 | 2489 | 3306 | 3306 | 3306 |
| Belt | 2 plies | 2 plies | 2 plies | 2 plies | 2 plies | 2 plies | 2 plies | 2 plies |
| Cord structure | 1 × 1 × 0.40 | 1 × 1 × 0.40 | 2 + 7 × 0.22 | 1 × 1 × 0.50 | 1 × 1 × 0.50 | 3 × 0.20 + 6 × 0.35 | 1 × 1 × 0.65 | 1 × 1 × 0.65 |
| Waving | FIG. 19 | FIG. 18 | none | FIG. 15 | FIG. 15 | none | FIG. 15 | FIG. 15 |
| Pitch P (mm) | 80 | 80 | — | 15 | 100 | — | 20 | 130 |
| P/W | 0.044 | 0.044 | — | 0.006 | 0.04 | — | 0.006 | 0.039 |
| Height H (mm) | 0.13 | 0.13 | — | 0.18 | 0.18 | — | 0.24 | 0.24 |
| H/P | 0.0016 | 0.0016 | — | 0.012 | 0.0018 | — | 0.012 | 0.0018 |

TABLE 5-continued

| | Tire | | | | | | | |
|---|---|---|---|---|---|---|---|---|
| | Ex. 5 | Ex. 6 | prior 2 | Ref. 4 | Ex. 7 | prior 3 | Ref. 5 | Ex. 8 |
| Average thickness R (mm) | 0.4 | 0.4 | 0.22 | 0.5 | 0.5 | 0.20 & 0.35 | 0.65 | 0.65 |
| R/W | 0.00022 | 0.00022 | | 0.0002 | 0.0002 | | 0.0002 | 0.0002 |
| Cord count/5 cm | 40 | 40 | 26 | 40 | 40 | 26 | 35 | 35 |
| Tire weight | 92 | 92 | 100 | 93 | 93 | 100 | 93 | 93 |
| Durability | 100 | 102 | 100 | 86 | 100 | — | — | — |
| Steering stability | 9 | 9 | 7 | 5 | 9 | 7 | 6 | 9 |
| Ride comfort | 8 | 8 | 7 | 8 | 8 | 7 | 8 | 8 |

What is claimed is:

1. A pneumatic tire comprising:

a carcass extending between bead portions through a tread portion and sidewall portions, and a belt disposed radially outside the carcass in the tread portion, said belt composed of at least two plies across the tread portion which include a radially outmost monofilament-cord ply and a radially inner multifilament-cord ply, the monofilament-cord ply made of monofilament cords laid at an inclination angle of from 15 to 30 degrees with respect to the tire circumferential direction, the multifilament-cord ply made of multi-filament cords laid at an inclination angle of from 15 to 70 degrees with respect to the tire circumferential direction, each said multi-filament cord made of a plurality of steel filaments twisted together, each said monofilament cord being a steel monofilament having a substantially circular cross sectional shape and a cross sectional area of from 0.09 to 0.30 sq. mm, each said monofilament cord spirally waved so that the wave pitches PA are in a range of from 14 to 50 mm, and the amplitude HA of each wave is in a range of from 0.002 to 0.02 times the pitch PA of the wave.

2. pneumatic tire comprising:

a carcass extending between bead portions through a tread portion and sidewall portions, and a belt disposed radially outside the carcass in the tread portion, said belt composed of at least two plies across the tread portion which include a radially outmost monofilament-cord ply and a radially inner multifilament-cord ply, the monofilament-cord ply made of monofilament cords laid at an inclination angle of from 15 to 30 degrees with respect to the tire circumferential direction, the multifilament-cord ply made of multi-filament cords laid at an inclination angle of from 15 to 70 degrees with respect to the tire circumferential direction, each said multi-filament cord made of a plurality of steel filaments twisted together, each said monofilament cord being a steel monofilament having a substantially circular cross sectional shape and a cross sectional area of from 0.09 to 0.30 sq. mm, each said monofilament cord two-dimensionally waved so that the wave pitches PB are in a range of from 5 to 50 mm, and the amplitude HB of each wave is in a range of from 0.002 to 0.05 times the pitch PB of the wave.

3. A pneumatic tire as defined in claim 1, wherein the monofilament steel cords in each said monofilament-cord ply are waved at certain wave pitches P in a range of from 0.008 to 0.08 times the circumference W of the tire.

4. The pneumatic tire according to claim 2, wherein the wave height H of each wave is in a range of from 0.002 to 0.025 times the pitch P of the wave.

5. The pneumatic tire according to claim 2, wherein each of the waved monofilament steel cords has an average thickness of from $0.13 \times 10^{-3}$ to $0.28 \times 10^{-3}$ times the circumference W of the tire.

6. The pneumatic tire according to claim 2, wherein the wave height H, of each wave is in a range of from 0.002 to 0.025 times the pitch P of the wave, and each of the waved monofilament steel cords has an average thickness of from $0.13 \times 10^{-3}$ to $0.28 \times 10^{-3}$ times the circumference W of the tire.

7. A pneumatic tire as defined in claim 2, wherein:

a carcass extending between bead portions through a tread portion and sidewall portions, and a belt disposed radially outside the carcass in the tread portion, wherein the belt comprises a ply made of waved steel monofilament cords having a cross sectional shape which is an oval or a rectangle whose corners are rounded so that the cross sectional shape has an aspect ratio Dh/Dw of from 0.65 to 0.95 and a minor axis and a major axis, the waved steel monofilament cords in the ply are disposed so that the minor axes thereof extend along the radial direction of the tire, and the waved steel monofilament cords (10B) are each (A) spirally waved into a form of (1) a normal spiral without bend or (2) a polygonal spiral with bends so that the wave pitches PA are in a range of from 14 to 50 mm, and the amplitude HA of each wave is in a range of from 0.002 to 0.02 times the pitch PA of the wave, or (B) two-dimensionally waved into (3) a curved wave without bend or (4) a bent wave with bends so that the wave pitches PB are in a range of from 5 to 50 mm, and the amplitude HB of each wave is in a range of from 0.002 to 0.05 times the wave pitch PB, or (C) waved in two orthogonal directions F1 and F2 wherein in a plane parallel to the direction Fl, the wave pitches PB are a constant value in a range of from 5 to 50 mm, and the amplitude HB of each wave is a constant value in a range of from 0.002 to 0.05 times the wave pitch PB, and in a plane parallel to the direction F2, the wave pitches PB2 are a constant value in a range of from 5 to 50 mm but different from the wave pitch PB, and the amplitude HB2 of each wave is a constant value in a range of from 0.002 to 0.05 times the wave pitch PB2 but different from the amplitude HB.

* * * * *

UNITED STATES PATENT AND TRADEMARK OFFICE
CERTIFICATE OF CORRECTION

PATENT NO. : 6,637,487 B2
DATED : October 28, 2003
INVENTOR(S) : Miyaki et al.

It is certified that error appears in the above-identified patent and that said Letters Patent is hereby corrected as shown below:

Title page,
Insert Item:

-- [30]     Foreign Application Priority Data

December 22, 1999   (JP)............................ 11-365470
    December 27, 1999   (JP)............................ 11-370563 --

Signed and Sealed this

Twenty-fifth Day of May, 2004

JON W. DUDAS
*Acting Director of the United States Patent and Trademark Office*